US007739159B1

(12) United States Patent
Chandrupatla et al.

(10) Patent No.: US 7,739,159 B1
(45) Date of Patent: Jun. 15, 2010

(54) AGGREGATION OF USER USAGE DATA FOR ACCOUNTING SYSTEMS IN DYNAMICALLY CONFIGURED NETWORKS

(75) Inventors: Sunil Kumar Chandrupatla, Santa Clara, CA (US); Aravind Sitaraman, Santa Clara, CA (US); Leslie Alan Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/198,590

(22) Filed: Nov. 23, 1998

(51) Int. Cl.
*G06Q 20/00* (2006.01)
(52) U.S. Cl. .............................. 705/30; 705/34; 705/39; 705/40; 379/111; 379/112; 379/114; 379/115; 379/117
(58) Field of Classification Search ............... 705/7, 705/39, 40, 30, 34; 708/231, 247, 220, 223, 708/224, 226; 709/229, 230, 224, 250; 703/20, 703/27; 320/389, 392; 379/114, 112, 113, 379/111, 115, 117
See application file for complete search history.

(56) References Cited

U.S. PATENT DOCUMENTS

| 5,283,783 | A | 2/1994 | Nguyen et al. ............. 370/16.1 |
|---|---|---|---|
| 5,287,103 | A | 2/1994 | Kasprzyk et al. ......... 340/825.52 |
| 5,519,704 | A | 5/1996 | Farinacci et al. ........... 370/85.13 |
| 5,555,244 | A | 9/1996 | Gupta et al. ................. 370/60.1 |
| 5,592,470 | A | 1/1997 | Rudrapatna et al. ......... 370/320 |
| 5,621,721 | A | 4/1997 | Vatuone ........................ 370/16 |
| 5,668,857 | A | 9/1997 | McHale .................... 379/93.07 |
| 5,673,265 | A | 9/1997 | Gupta et al. ................. 370/432 |
| 5,678,006 | A | 10/1997 | Valizadeh et al. ....... 395/200.02 |
| 5,715,394 | A | 2/1998 | Jabs ....................... 395/200.11 |
| 5,717,604 | A | 2/1998 | Wiggins ...................... 364/514 |
| 5,729,546 | A | 3/1998 | Gupta et al. ................. 370/434 |
| 5,740,176 | A | 4/1998 | Gupta et al. ................. 370/440 |
| 5,745,556 | A | 4/1998 | Ronen ........................ 379/127 |
| 5,768,521 | A | 6/1998 | Dedrick ................. 395/200.54 |
| 5,778,182 | A | 7/1998 | Cathey et al. .......... 395/200.49 |
| 5,787,253 | A | * 7/1998 | McCreery et al. ........... 395/200 |
| 5,799,017 | A | 8/1998 | Gupta et al. ................. 370/419 |

(Continued)

OTHER PUBLICATIONS

Active Software, Inc., "Active Software's Integration System", printed from http://www.activesw.com/products/products.html, on Jul. 24, 1998.

(Continued)

*Primary Examiner*—Nga B. Nguyen
(74) *Attorney, Agent, or Firm*—Patent Capital Group

(57) ABSTRACT

A method and apparatus for providing an aggregated account metering system to a computer network service provider resulting in comprehensive detailed subscriber accounting records. Accounting start-stop event data is retrieved from accounting servers. The accounting records are parsed to a first adapter where they are then published on an active information bus. Network flow data is collected from routers throughout the packet switch network environment by network flow collectors. The collectors serve to aggregate and, optionally, filter the flow data. The network flow data is parsed to a second adapter where it is then published on an active information bus. An integrating accounting adapter subscribes to and collects accounting event data and network flow data and correlates this data into a detailed call record that is formatted as desired.

28 Claims, 3 Drawing Sheets

U.S. PATENT DOCUMENTS

| | | | |
|---|---|---|---|
| 5,812,529 A | 9/1998 | Czarnik et al. | 370/245 |
| 5,852,812 A * | 12/1998 | Reeder | 705/39 |
| 5,867,495 A | 2/1999 | Elliott et al. | 370/352 |
| 5,893,077 A | 4/1999 | Griffin | |
| 5,898,780 A | 4/1999 | Liu et al. | 380/25 |
| 5,905,736 A | 5/1999 | Ronen et al. | 370/352 |
| 5,913,037 A | 6/1999 | Spofford et al. | 395/200.56 |
| 5,918,016 A | 6/1999 | Brewer et al. | 395/200.5 |
| 5,922,051 A | 7/1999 | Sidey | 709/223 |
| 5,960,409 A | 9/1999 | Wexler | 705/14 |
| 5,968,116 A | 10/1999 | Day, II et al. | 709/202 |
| 5,970,477 A | 10/1999 | Roden | 705/32 |
| 5,991,828 A | 11/1999 | Horie et al. | 710/8 |
| 6,009,103 A | 12/1999 | Woundy | 370/401 |
| 6,018,619 A | 1/2000 | Allard et al. | 395/200.54 |
| 6,026,440 A | 2/2000 | Shrader et al. | 709/224 |
| 6,026,441 A | 2/2000 | Ronen | 709/227 |
| 6,035,281 A | 3/2000 | Crosskey et al. | 705/14 |
| 6,052,730 A | 4/2000 | Feliciano et al. | 709/225 |
| 6,091,951 A | 7/2000 | Sturniolo et al. | 455/432 |
| 6,119,109 A | 9/2000 | Muratani et al. | |
| 6,119,160 A | 9/2000 | Zhang et al. | 709/224 |
| 6,230,203 B1 * | 5/2001 | Koperda et al. | 709/229 |
| 6,240,092 B1 * | 5/2001 | Ginzboorg et al. | 709/229 |
| 6,243,667 B1 * | 6/2001 | Kerr et al. | 703/27 |
| 6,308,328 B1 | 10/2001 | Bowcutt et al. | |
| 6,338,046 B1 * | 1/2002 | Saari et al. | 705/34 |

OTHER PUBLICATIONS

Bracho, Dr. Rafael, "Integrating the Corporate Computing Environment with Active Software", Nov. 18, 1998, Active Software, pp. 1-17.

Cisco Systems, Inc., "CiscoDNS/DHCP Manager V.1.1", printed from http://www.combinet.com/warp/public/751/dnsmg/dnsmg_ds.htm, on Sep. 10, 1998, 4 pgs.

Cisco Systems, Inc., "Cisco DNS/DHCP Manager V.1.1", printed from http://www.combinet.com/warp/public/751/dnsmg/dnsmg_pa.htm, on Sep. 10, 1998, 7 pgs.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pgs.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Edell et al., "Billing Users and Pricing for TCP", 1995, IEEE Journal on Selected Areas in Communications, pp. 1-14.

IBM, "IBM introduces new subscriber management system for Internet service providers", Dec. 2, 1998, IBM News, p. 1.

Network Registrar, "Hot Products & Solutions—IP Address Management: A White Paper", Amer. Internet Corporation, Bedford, MA, printed from http://www.american.com/ip-mgmt.html, on Jul. 24, 1998.

Carrel, D. et al., The TACACS+ Protocol, Version 1.78, Cisco Systems, Inc., printed from ftp://ftp-eng.cisco.com/edweber/tac-rfc.1.78.txt on Oct. 23, 2000.

Nahrstedt, Klara, "An Architecture for End-to-End Quality of Service Provision and its Experimental Validation," A Dissertation in Computer and Information Sciences, University of Pennsylvania (149 pages) 1995.

Pountain, Dick., "The New Penguin Dictionary of Computer," an A-Z of Computing Jargon and Concepts, published Jul. 15, 2002 by Penguin, 2 pages.

* cited by examiner

AGGREGATION OF USER USAGE DATA FOR ACCOUNTING SYSTEMS IN DYNAMICALLY CONFIGURED NETWORKS

BACKGROUND OF THE INVENTION

1. Field of the Invention

The present invention relates to an account metering method and apparatus for use in a computer network. More particularly, the present invention relates to a method and apparatus for obtaining and correlating account metering data from two distinct sources: start-stop event accounting records associated with accounting servers and detailed flow data collected from numerous routers throughout the network environment.

2. Background

The ability to provide computer networking capabilities to the home personal computer (PC) is most commonly provided by telephone companies (Telcos) or commercial Internet Service Providers (ISPs) that maintain network operation centers (NOCs) along the information superhighway. Network operation centers, commonly located within wide area networks (WANs), serve to house the network interfaces and service components necessary to provide routing, bridging and other essential networking functions. It is via these network operation centers that the user or subscriber, through a host computer connected to an access point, can connect with public domains, such as the Internet and private domains, such as intra-networks and community-of-interest (pay-for-use) domains.

Currently, Telcos and ISPs are limited in the manner that they can charge customers for a product. Basically, Telcos and ISPs are confined to either charging a flat fee on a monthly basis, thus allowing the user unlimited network access for the specified period, or charging the user on a rate basis, typically, an hourly rate. These billing schemes are unsophisticated because they provide for only a simplified method of accounting for the wide spectrum of events that a user undertakes while the user is logged on to the access point. Current technology only allows for the Telco or ISP to account for the duration of the period from when a user logs on to and when the user subsequently logs off.

As an example, FIG. 1 schematically illustrates a current model of a network accounting system. In this typical networking environment 10, a user 12 implements a "dashboard" application on a host/computer 14 that requires them to input identification and authorization information, such as a user name and a password. This information is then sent, via the host having a dial-up connection, to the Telco or ISP operated NOC 16. A dial-up connection access method is implemented by a modem (not shown) located at the host and a modem pool (not shown) maintained at the ISP. Those of ordinary skill in the art will recognize that other types of access methods may be provided by an ISP such as frame relay, leased lines, ATM (asynchronous transfer mode), ADSL, and the like. A network access server (NAS) 18 located at the NOC 16 receives the identification and authorization information and proxies it to an authentication, authorization and accounting (AAA) server 20. Once the server verifies the user authentication and authorization it grants the user log-on access to public domains or private domains, such as the Internet 22. At the moment authorization is granted, counters 24 within the NAS 18 are engaged which begin tracking the duration of the session as well as the byte count encountered during the session. The record of this account log-on event is then forwarded to the AAA server 20. Subsequently, when the user desires to log-off or a log-off is warranted by other factors outside the control of the user, the counters 24 within the NAS 18 are stopped and the appropriate accounting log-off event is forwarded to the AAA server 20. Thus, the accounting information provided to the service provider is limited to a subscriber's account log-on and log-off U activities (start and stop times) and byte counts. This severely limits the billing schemes that may be implemented.

The Telco or ISP, as well as the subscribers, would benefit from having a more developed account metering scheme that makes possible alternate billing options. The service provider, who has real-time access to such detailed subscriber account activity, can then devise and offer customized billing rates and level-of-service schemes to subscribers based on a variety of factors. For example, billing schemes could be devised based upon what services a user accesses (i.e. Internet versus private domain services) and the duration of such connections (which might differ from the overall connection duration). Billing could also be provided based upon the priority given to the data transmitted (i.e. text versus video or audio) or the byte count intensity of specific flows. Additionally, service providers could charge customers based on the transmission roadmap (i.e. number of hops encountered for a given flow). The potential for extensive and diverse rating schemes and billing schemes becomes apparent if the service provider has efficient access to comprehensive accounting records. The subscriber benefits because, instead of the service provider spreading costs equally among the entire subscriber base, rates can be modified so that the subscriber who makes less costly connections can be charged commensurately less. As networking systems continue to scale up and the number of service providers grow, competition and subscriber demand will put pressure on providers to implement billing rates and service plans that are more tailored to the individual requisites of the users. Network service providers confronted with this problem will want systems that overcome these issues and provide detailed subscriber accounting information in an automated concise format.

As networking systems continue to scale-up, it will also become vital for the service providers to have efficient access to accounting records as a way of assessing user trends and adjusting the network configuration in accordance with these trends. As the information superhighway becomes increasingly more congested, the ability of the service providers to facilitate network traffic becomes a heightened concern. If the service providers have the necessary information readily available to foresee user trends and bottlenecks in transmission, then appropriate modifications can be made; for example, hardware may be added, software may be modified or traffic may be rerouted. Ultimately, the subscribers benefit by receiving a higher quality and more reliable service provided to them.

Providing account metering on Packet Switched Networks (PSNs) is complicated because no integrated accounting mechanism exists to resolve information originating from multiple sources throughout the PSN structure. The ISPs and Telcos would benefit from an account metering system capable of aggregating accounting-related data originating from various sources on the composite PSN, capturing the data efficiently and correlating the data to provide a comprehensive subscriber-specific accounting record. For instance, network flow data can be collected at downstream routers located at Points of Presence (PoPs). This data contains detailed traffic statistics, such as a timestamp of a specific flow, source and destination IP addresses, source and destination port numbers, next hop addresses, total byte count in a specific flow, and the like. However, since the source of such flow data originates from numerous PoPs, current technology has not provided for this data to be collected, filtered and aggregated efficiently so that it can benefit service providers in devising detailed account rating and billing schemes. Additionally, this flow data has no accounting benefit unless it can be matched against the user-specific accounting start-stop events recorded at the accounting servers. Therefore, the need exists to combine efficiently the accounting event data with the network flow data to result in one unified comprehensive accounting record that details both user start-stop accounting events and the flow information corresponding to specific user sessions.

BRIEF DESCRIPTION OF THE INVENTION

A method and apparatus for providing an aggregated account metering system to a computer network service provider resulting in comprehensive detailed subscriber accounting records. Accounting start-stop event data is retrieved from accounting servers. The accounting records are forwarded to a first adapter where they are parsed and then published on an active information bus. Network flow data is retrieved from network flow collectors that are in communication with routers. The network flow data is forwarded to a second adapter where it is aggregated and then published on an active information bus. An integrating accounting adapter subscribes to and collects accounting event data and network flow data and correlates this data into a detailed call record formatted as desired.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
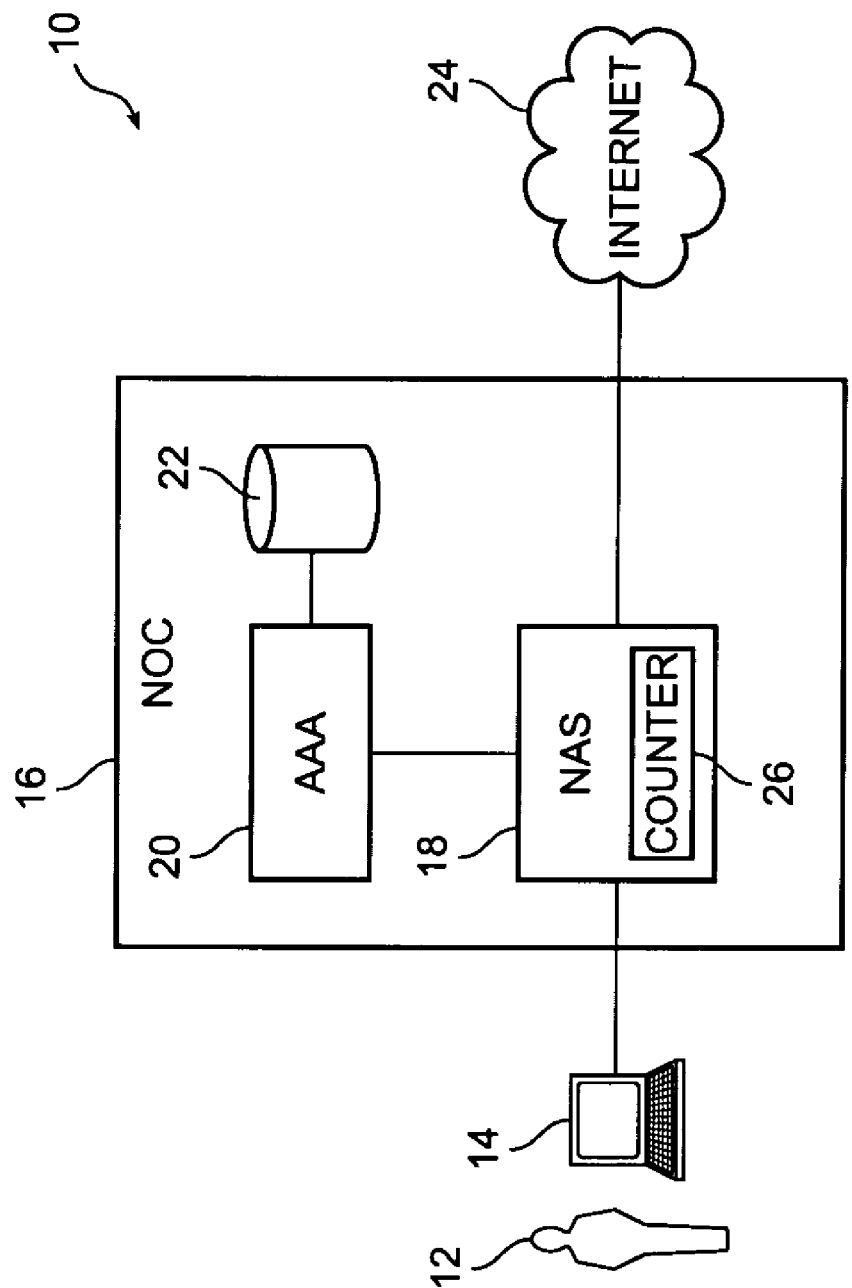
FIG. 1 is a schematic drawing of a computer network illustrating a prior art approach to log-on and log-off account metering in accordance with the prior art.
Figure 2:
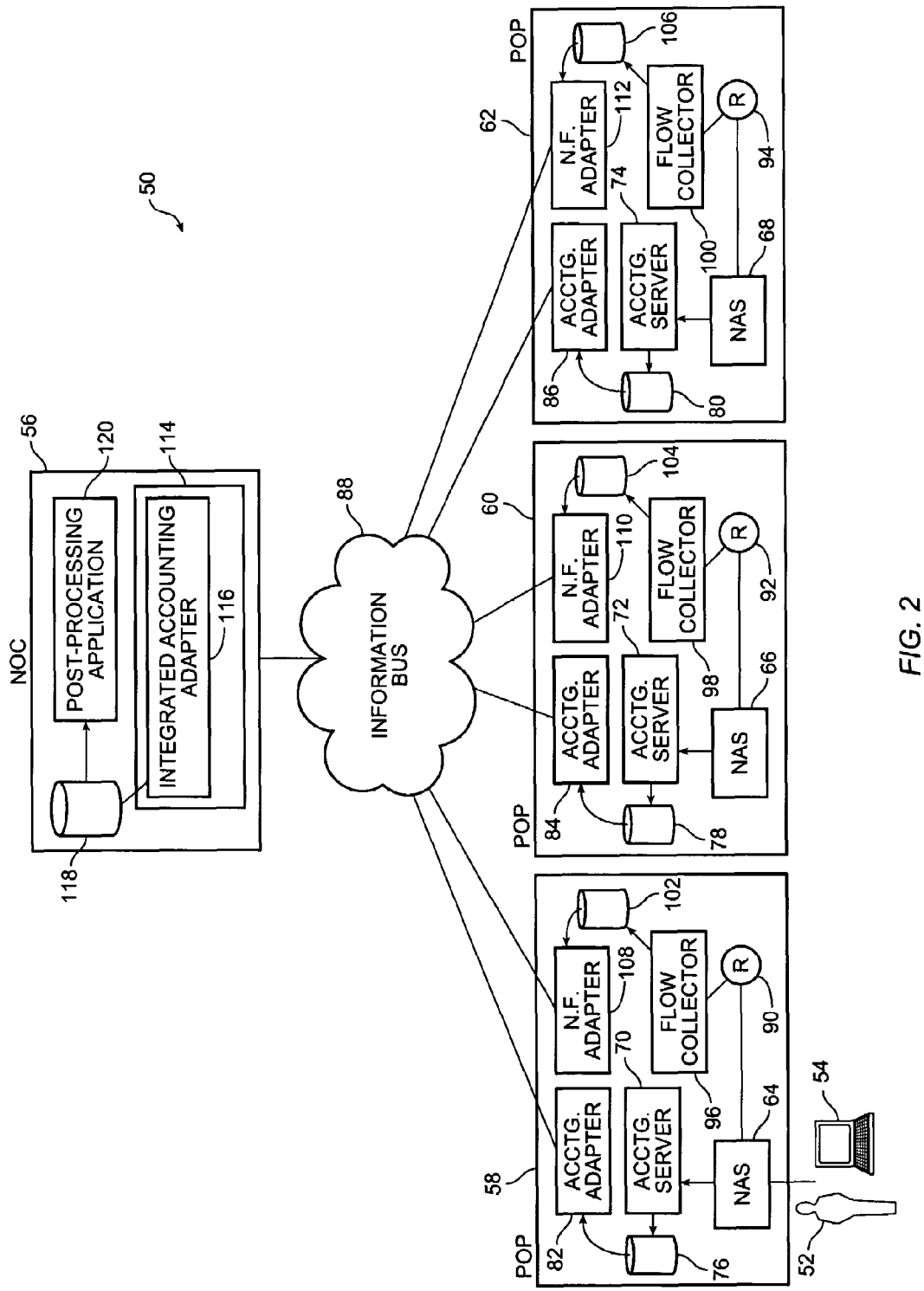
FIG. 2 is a schematic drawing of a computer network illustrating the real-time conveyance and aggregation of accounting related data from both accounting servers and network flow collectors in accordance with a presently preferred embodiment of the present invention.

FIG. 2 illustrates schematically a dynamically configured packet switch network (PSN) 50 embodying the aggregated accounting system in accordance with a presently preferred embodiment of the present invention. Accounting related information originates from two distinct sources within the PSN 50. One source is accounting servers that store subscriber start-stop events. The other is from flow collectors that store network flow usage records. The present invention retrieves, aggregates and publishes these records to a centralized accounting interface where they are synthesized to form a unified detailed call record.

A subscriber 52 by way of a computer/host 54 is granted access to a packet switch network 50 through network service providers. Network service providers, such as Internet Service Providers (ISPs) or Telephone Companies (Telcos), maintain Points of Presence (PoPs) 58, 60 and 62 and network operation centers (NOC) 56. PoPs 58, 60 and 62 are geographical areas serviced by NOCs which are managed by an ISP or a Telco. Located within the PoPs 58, 60 and 62 are network access servers (NASs) 64, 66 and 68 that grant network access to subscribers 52 through authorization and authentication processes. The NASs 64, 66 and 68 are in communication with accounting servers 70, 72 and 74 which may be physically located at the same location as the corresponding NAS, as shown in FIG. 2, or the accounting servers may be located at the NOC or elsewhere. The location and the quantity of accounting servers are dictated by a number of factors including the complexity of the system, the geographical span of the service provider's system and network bandwidth concerns.

For example, the accounting servers may include an authentication, authorization and accounting (AAA) server, such as Cisco ACS or Cisco Secure, manufactured by Cisco Systems, Inc. of San Jose, Calif. or any other similar standard accounting server. In connection with the accounting servers 70, 72 and 74 are storage devices 76, 78 and 80 that serve as memory storage devices for the flat file accounting records proxied from the accounting servers 70, 72 and 74. The NASs 64, 66, and 68 communicate with the accounting servers 70, 72 and 74 by means of a standardized internet protocol such as, for example, the Remote Authentication Dial-In User Service (RADIUS) protocol. Other protocols, known by those of ordinary skill in the art, can also be used to communicate accounting start/stop event data between the NASs 64, 66 and 68 and accounting servers 70, 72 and 74.

Once the subscriber 52 has been granted network access through a successful authorization and authentication process, for example, at PoP 58, the NAS 64 or another interface located at PoP 58, will simultaneously generate accounting start packets and forward such to an accounting server 70. It is feasible, and within the inventive concept herein disclosed, to generate and forward such start/stop event packets from within other hardware located within the PoP 58. For example, accounting start/stop event requests may be generated and forwarded by a gateway device, such as Cisco 6510 Service Selection Gateway (SSG) manufactured by Cisco Systems, Inc. of San Jose, Calif. In accordance with a presently preferred embodiment of the present invention the RADIUS account start packet will have the following attributes associated with the record:

| | |
|---|---|
| Acct-Status-Type = | Start |
| NAS-IP-Address = | ip_address |
| User-Name = | "username" |
| Acct-Session-Id = | "session_id" |
| Framed-IP-Address = | user_ip |
| Proxy-State = | "n" |
| where: | |
| ip_address = | IP address of the SSG interface card 1. |
| username = | Name used to log on to the service provider network |
| session_id = | Session Number |
| user_ip = | IP address of the user's system |
| n = | Accounting record queuing information |

Once the subscriber/user 52 completes a log-off process or other factors outside the subscriber's control cause a log-off to occur, the NAS 64, or another interface located at the PoP 58, will generate an account stop packet and forward such to an accounting server 70. In accordance with a presently preferred embodiment of the present invention the RADIUS accounting stop packet will have the following attributes associated with the record:

| | |
|---|---|
| Acct-Status-Type = | Stop |
| NAS-IP-Address = | ip_address |
| User-Name = | "username" |
| Acct-Session-Time = | time |
| Acct-Terminate-Cause = | cause |
| Acct-Session-Id = | "session_id" |
| Framed-IP-Address = | user_ip |
| Proxy-State = | "n" |
| where: | |
| ip_address = | IP address of the SSG interface card 1. |
| username = | Name used to log on to the service provider network. |
| time = | Length of session in seconds. |
| cause = | Cause of account termination. These include:<br>- User-Request  - Session-Timeout |
| session_id = | Session Number. |
| user_ip = | IP address of the user's system. |
| n = | Accounting record queuing information. |

The accounting start-stop event data is not limited to account log-on and account log-off events. Other start-stop events that a subscriber can trigger are also feasible and within the inventive concept herein disclosed. These events include, but are not limited to; (1) a subscriber establishing or terminating a tunnel-based service such as an L2F (Layer Two Forwarding) or L2TP (Layer Two Tunneling Protocol) service, for example; and (2) a subscriber establishing or terminating a Point to Point Protocol (PPP) connection. Interfaces at the PoP 58 will generate the accounting start and stop packets for each of these events and forward the packets to the accounting server 70. The accounting start-stop packets are capable of accounting for the duration of these events, as well as the number of bytes encountered for any of these events.

As data accumulates within the storage device 76 associated with corresponding accounting server 70, the accounting adapter 82 will periodically parse the accounting start-stop event data from the storage device 76. The accounting adapter 82 will be configured to parse accounting records from the storage device 76 at prescribed time intervals, most commonly defined in terms of seconds. The accounting records are then published as accounting event data by the accounting adapter 82 on to an information bus 88. The information bus 88 can be Common Object Request Broker Architecture (CORBA)-based, which handles the communication of messages to and from objects in a distributed, multi-platform environment, or another acceptable communication means can be used as known by those of ordinary skill in the art.

CORBA provides a standard way of executing program modules in a distributed environment. The broker, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

For a typical accounting event published on the information bus 88 the following data fields will be present:

TABLE 1

| Field | Type | Comments |
|---|---|---|
| strNasId | string | The NAS address where the subscriber is logging. |
| strTimeStamp | string | Time when the packet is published. |
| guidSource | string | GUID of the accounting adapter. |
| guidTarget | string | GUID of the target device subscribing to the accounting adapter. |
| accountingPacket | structure of AV pairs | Includes structure of AV pairs; name and value. |

A second source of accounting-related data is generated throughout the PSN 50 at the routers 90, 92 and 94 located within the PoPs 58, 60 and 62. Routers located throughout the PSN 50 serve to forward and direct network traffic between the users and the domains. The data packets that flow through the routers 90, 92 and 94 contain detailed flow data such as Layer 2, Layer 3 and Layer 4 flow information contained in respective packet headers. The routers are configured to send this detailed flow data to network flow collectors 96, 98 and 100. Numerous routers may exist in any one given PoP, so that the network flow collectors are in communication with any number of routers within the PoP. The network flow collectors 96, 98 and 100 collect the flow data and log the information onto flat files at storage devices 102, 104 and 106.

The network flow data exported by a network flow collector comprises expired traffic flows that contain specific traffic statistics. These traffic flows contain detailed information about network layer sources and destinations, including the level of individual applications and protocols constituting the end-to-end conversation. For example, the fields included in the detailed traffic statistics may include the following: timestamp of the flow, source and destination IP addresses, source and destination port numbers, input and output interface number, next hop address, number of packets in the flow and the first and last timestamps of packets in a particular flow. In accordance with a presently preferred embodiment of the present invention the network flow collectors use an aggregation scheme based on IP addresses. An example of the contents of a network flow usage file follows:

| | |
|---|---|
| ROUTER 171.69.73.146/TYPE IP/AGGREGATION SourceNode/PERIOD 10/UTC_Begin 869784176/UTC_End 869784776 | |
| where: | |
| ROUTER 171.69.73.146 = | The IP address of the router from which the network flow file was sent. |
| TYPE IP = | Type of protocol used. |
| AGGREGATION SourceNode = | Aggregation scheme used. |
| PERIOD 10 = | The time period between which the network flow collector logs information. |
| UTC_Begin = | Beginning time for the collection of data. |
| UTC_End = | End time for the collection of data. |
| Subsequent lines in the file read as follows: | |
| 172.22.6.63/103/7828/33 | |
| where: | |
| 172.22.6.63 = | Source IP address. |
| 103 = | Sum of all packets sent. |
| 7823 = | Total number of bytes (octets) sent from the source |
| 33 = | Number of flows aggregated into this flow. |

The comprehensive detailed traffic statistics can then be organized by aggregation schemes or the data volume reduced by filtering schemes. For example, aggregation schemes can be devised based upon the following parameters: a specified time period, source or destination address present in the flow export data, source or destination ports, matching source and destination pairs in the input data, protocols present in the input data, interfaces present in the input data or every communicating pair in the input data. Filtration can permit or deny the further processing of network flow usage data as a way of customizing the network flow usage data. For example, the following data fields can be filtered: Layer 2 MAC source or destination address, Layer 3 IP source or destination address, Layer 4 input or output interface numbers, Layer 4 source or destination port, and the like.

The network flow data is parsed from the a network flow collector storage device 102 by network flow adapter 108. Identification information within the network flow file will allow for the network flow adapter 108 to parse only the network flow data that it subscribes to. The network flow adapter 108 will be configured to parse network flow data from the network flow collector storage device 102 at prescribed time intervals, most commonly defined in terms of seconds. Once the network flow adapter 108 parses the files they create network flow events and publish the events on an information bus 88. The information bus can be CORBA-based, as discussed above, or another acceptable communication means. For a typical network flow event published on the information bus the following data fields will be present:

TABLE 2

| Field | Type | Comments |
| --- | --- | --- |
| routerName information | string | IP address of router exported. |
| flowTime | integer | hhmm(hour/minute) when file is logged. |
| guidSource | string | GUID of the Network Flow Adapter. |
| guidTarget | string | GUID of the target device subscribing to the network flow event. |
| flowHeader | string | First line in the Network Flow data. |
| flowPacket | structure of field arrays | Array contains srcIPaddress, sumPackets, totalBytes, numFlows. |

Once the accounting events and the network flow usage events are published on the information bus 88 the subscribing target device 114 collects the data. The target device 114 is maintained by an ISP or Telco and is located at a NOC 56 within the PSN 50. The target device 114 will capture only those accounting events and network flow usage events that it subscribes to. An Integrated Accounting Adapter 116 incorporated with the target device 114 correlates the accounting start-stop event data and the network flow data resulting in a call detail record. Typically, the correlation accomplished within the Integrated Accounting Adapter will be to match user accounting start-stop events with corresponding user network flow data resulting in specific call detail records associated with specific users/subscribers. This type of correlation is beneficial to later rating and billing applications. Other modes of correlation can be performed that would suit the particular needs of the service provider. For instance, correlation schemes can be used to support network planning and monitor network resources. The correlated call detail records are then forward to a storage device 118 where they are written into flat files for post processing. In most instances, post-processing applications 120 will involve a service provider maintained and unique billing application that reformats the call detail records to meet specific needs. Other post-processing applications, such as traffic analysis tools are also feasible and within the inventive concepts herein disclosed. An example of an alternate post-processing application would be an account that details at what interfaces within the network flow congestion exists. Such an application would be beneficial to the ISP or Telco in determining how flows could be re-routed or what additional hardware is needed to alleviate the problem. Those of ordinary skill in the art will recognize that the data may be organized in many other useful ways without departing from the inventive concept herein.

Figure 3:
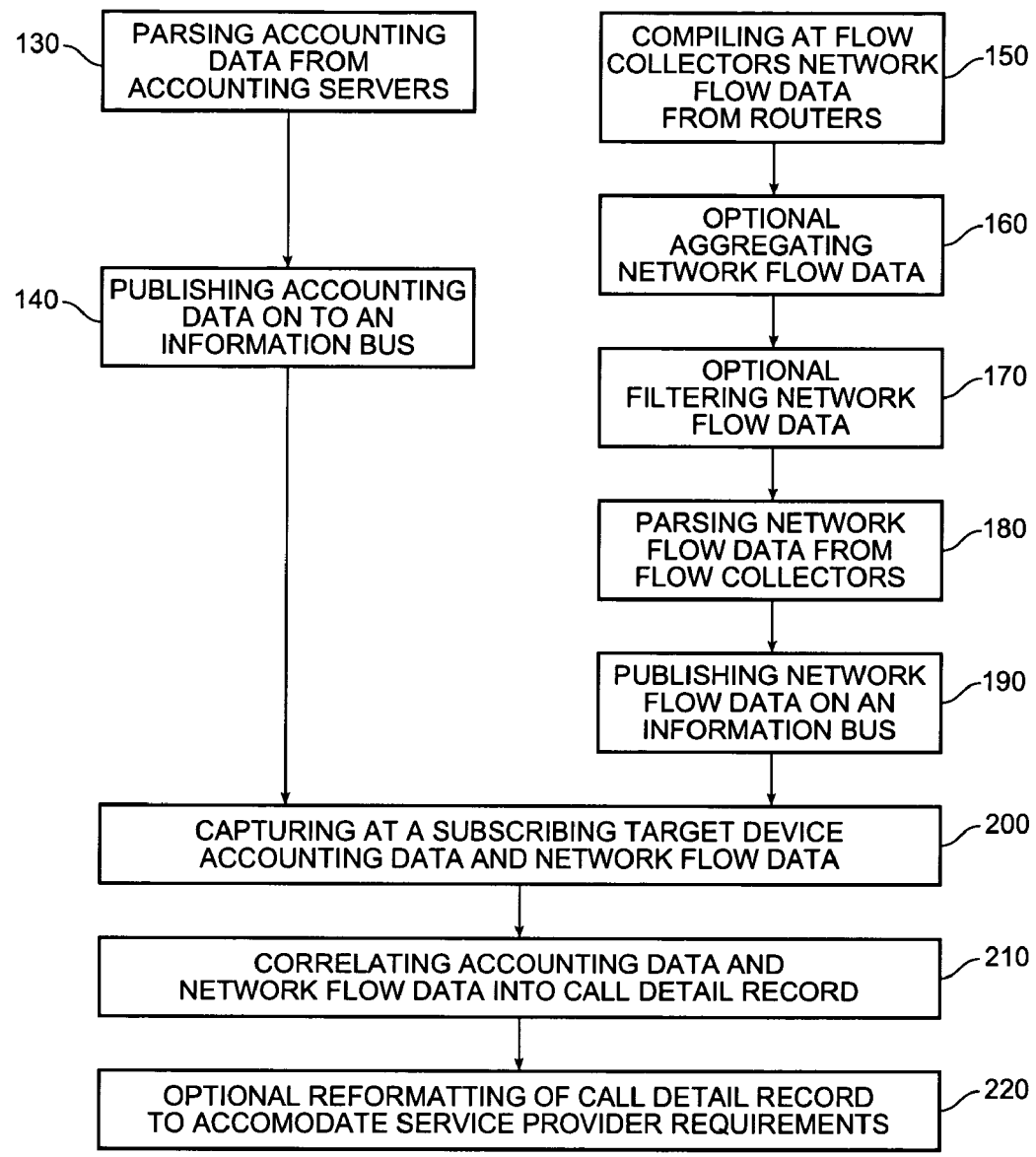
FIG. 3 is a flow diagram of a method for real-time conveyance and aggregation of accounting related data in a packet switch network in accordance with a presently preferred embodiment of the present invention.

FIG. 3 illustrates a flow diagram of a method for implementing an aggregated account metering method in a packet switched network (PSN) in accordance with a presently preferred embodiment of the present invention. Accounting related information originates from two distinct sources within a PSN; the accounting start-stop event data stored on accounting servers and the network flow data captured at flow collectors from routers located throughout the network at Points of Presence (PoPs).

In FIG. 3 at reference number 130, the accounting start-stop event data are parsed by an accounting adapter from the various data banks associated with the accounting servers. The accounting start-stop event data typically include user specific account log-on and account log-off intervals and byte counts encountered during specified account sessions. In addition, the accounting start-stop event data may include service start and service stop intervals and connection start and connection stop intervals, as well as corresponding byte counts for a specific interval. The parsing accounting adapter is in communication with each subdirectory within the accounting server's memory bank on prescribed intervals. The communication link between the accounting servers and accounting adapters may be conducted according to a suitable internet protocol, such as the Radius Authentication Dial-In User Service (RADIUS) protocol. Those of ordinary skill in the art will realize that other protocols can be used as an acceptable communication link between the various communication interfaces that encounter accounting start-stop event data. Once parsed, at reference number 140 the accounting start-stop event data are published onto an information bus. For example, the information bus may be CORBA-based, as discussed above in more detail, or another acceptable communication means can be used as known by those of ordinary skill in the art.

Concurrently with the accounting adapter parsing and publishing accounting start-stop event data, at reference number 150 a network flow collector compiles, via subscription, network flow data accumulated from numerous routers throughout the PoPs. At reference number 160, the network flow collector aggregates the network flow data according to a configured aggregation scheme. While the aggregation performed within the network flow collectors is not essential to the overall inventive concepts herein disclosed, aggregation serves to coordinate the data in accordance with a preferred designated parameter. A preferred aggregation scheme used in accordance with a presently preferred embodiment of the present invention is based on IP addresses. Other aggregation schemes are also possible and within the inventive concept herein disclosed. Examples of other aggregation schemes include, but are not limited to, aggregation schemes based on the following: a specified time period, source or destination address present in the flow export data, source or destination ports, matching source and destination pairs in the input data, protocols present in the input data, interfaces present in the input data or every communicating pair in the input data. Additionally, the network flow adapter, at reference number 170, may use an optional filtering scheme that is performed for data volume reduction and further customizing the network flow data. Filtering serves to eliminate extraneous data from the further processing, lowering the byte count and making the overall aggregating account metering process more efficient. Filtering defines what data is included or excluded from further processing and multiple permit or deny filters can be imposed. Filtering can be imposed either prior to aggregation or once aggregation has been completed. By way of example, the following data fields can be filtered: network layer IP source or destination address, next hop address, input interface number, output interface number, source or destination port or protocol.

At reference number 180, the network flow adapter, at a prescribed interval, parses the various network flow collectors. The parsing act results in the network flow adapters retrieving detailed network traffic flow statistics. These traffic flows contain detailed information about network layer sources and destination, including the level of individual applications and protocols constituting the end-to-end conversation. By way of example, the fields in the detailed traffic statistics may include the following: timestamp of the flow, source and destination IP addresses, source and destination port numbers, input and output interface number, next hop address, number of packets in the flow and the first and last timestamps of packets in a particular flow. Once the network flow data has been parsed from the flow collectors to the network flow adapters, at reference number 190 the data is published on to the information bus. As for the accounting adapter publication, the information bus may be CORBA-based or otherwise as discussed in more detail above.

At reference number 200, the subscribing target device captures the accounting start-stop event data and the network flow data from the information bus. At reference number 210, the accounting start-stop event data and the network flow data are correlated within the integrated accounting adapter. The correlation accomplished within the integrated accounting adapter will, routinely, be to match user accounting start-stop events with user flow data resulting in specific call detail records associated with specific users/subscribers. This type of correlation will be used by subsequent rating and billing applications. Other modes of correlation can be performed that would suit the particular needs of the service provider. For instance, correlation schemes can be used to support network planning and to monitor network resources. At reference number 220, the post-correlated call detail records can be optionally reformatted in a conventional manner to meet service provider's post-processing applications. Post-processing applications include service provider rating and billing applications, network planning applications and monitoring of network resources as well as other applications which can benefit from the type of information aggregated.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed:

1. A method for accounting for network usage comprising:
    obtaining accounting start-stop event data from two or more accounting servers via an information bus, wherein the information bus contains the accounting start-stop event data published by the two or more accounting servers;
    obtaining network flow data independent from said accounting start-stop event data from two or more routers within a network through intermediary netflow collectors, said network flow data including a number and type of packets for a flow, wherein the network flow data also includes a protocol type, a source and destination Internet protocol (IP) address, a next hop address, and a first and last timestamp of packets in the flow; and
    correlating said accounting start-stop event data and said network flow data into a subscriber specific call detail record unique to said user by matching said accounting start-stop event data associated with said user with said network flow data associated with said user, and wherein the call detail record is reformatted to identify a quality of service for the flow, and a priority designated for the flow.

2. The method of claim 1 wherein said obtaining accounting start-stop event data further comprises:
    parsing said accounting start-stop event data from the two or more accounting servers on a prescribed time interval; and
    publishing said accounting start-stop event data on an information bus.

3. The method of claim 1 wherein said obtaining accounting start-stop event data further comprises:
    collecting said accounting start-stop event data at a target device that subscribes to said accounting start-stop event data.

4. The method of claim 2 wherein said obtaining accounting start-stop event data further comprises:
    collecting said accounting start-stop event data at a target device that subscribes to said accounting start-stop event data.

5. The method of claim 1 wherein said obtaining network flow data further comprises:
    aggregating said network flow data at said intermediary netflow flow collector according to a service provider defined aggregation scheme.

6. The method of claim 5 wherein aggregating said network flow data further comprises:
    basing aggregation of said network flow data on a specified time period.

7. The method of claim 5 wherein aggregating said network flow data further comprises:
    basing aggregation of said network flow data on the internet Protocol Layer 3 source address.

8. The method of claim 5 wherein aggregating said network flow data further comprises:
    basing aggregation of said network flow data on the Internet Protocol Layer 4 destination address.

9. The method of claim 1 wherein said obtaining network flow data further comprises:
    filtering said network flow data at the intermediary netflow collector according to a service provider defined filtration scheme.

10. The method of claim 1 wherein said obtaining network flow data further comprises:

collecting said network flow data from the two or more routers and forwarding said network flow data to the intermediary netflow collectors;

aggregating said network flow data according to a defined aggregation scheme;

parsing said network flow data from said network flow collector;

publishing said network flow data on an information bus.

11. The method of claim 10 wherein said obtaining network flow data further comprises:

filtering said network flow data according to a service provider defined filtration scheme.

12. A method for accounting for network usage comprising:

parsing accounting start-stop event data from an accounting server on a prescribed time interval;

publishing said accounting start-stop event data on an information bus;

collecting network flow data independent from said accounting start-stop event data from a network router and forwarding said network flow data to a network flow collector, said network flow data including a number and type of packets for a flow, wherein the network flow data also includes a protocol type, a source and destination Internet protocol (IP) address, a next hop address, and a first and last timestamp of packets in the flow;

aggregating said network flow data according to a prescribed aggregation scheme;

parsing said network flow data from said network flow collector;

publishing said network flow data on an information bus;

collecting said accounting start-stop event data and said network flow data at a target device that subscribes to said accounting start-stop event data and said network flow data along with accounting start-stop event data from a different accounting server and network flow data from a different router; and correlating said accounting start-stop event data and said network flow data into a subscriber specific call detail record unique to said user by matching said accounting start-stop event data associated with said user with said network flow data associated with said user, and wherein the call detail record is reformatted to identify a quality of service for the flow, and a priority designated for the flow.

13. An apparatus for accounting for network usage comprising:

a means for obtaining accounting start-stop event data from two or more accounting servers via an information bus, wherein the information bus contains the accounting start-stop event data published by the two or more accounting servers;

a means for obtaining network flow data independent from said accounting start-stop event data from two or more routers within a network through intermediary netflow collectors, said network flow data including a number and type of packets for a flow, wherein the network flow data also includes a protocol type, a source and destination Internet protocol (IP) address, a next hop address, and a first and last timestamp of packets in the flow; and a means for correlating said accounting start-stop event data and said network flow data into a subscriber specific call detail record unique to said user by matching said accounting start-stop event data associated with said user with said network flow data associated with said user, and wherein the call detail record is reformatted to identify a quality of service for the flow, and a priority designated for the flow.

14. An apparatus for accounting for network usage comprising:

means for parsing accounting start-stop event data from an accounting server on a prescribed time interval;

means for publishing said accounting start-stop event data on an information bus;

means for collecting network flow data independent from said accounting start-stop event data from a network router and forwarding said network flow data to a network flow collector, said network flow data including a number and type of packets for a flow, wherein the network flow data also includes a protocol type, a source and destination Internet protocol (IP) address, a next hop address, and a first and last timestamp of packets in the flow;

means for aggregating said network flow data according to a prescribed aggregation scheme;

means for parsing said network flow data from said network flow collector;

means for publishing said network flow data on an information bus;

means for collecting said accounting start-stop event data and said network flow data at a target device that subscribes to said accounting start-stop event data and said network flow data along with accounting start-stop event data from a different accounting server and network flow data from a different router; and means for correlating said accounting start-stop event data and said network flow data into a subscriber specific call detail record unique to said user by matching said accounting start-stop event data associated with said user with said network flow data associated with said user, and wherein the call detail record is reformatted to identify a quality of service for the flow, and a priority designated for the flow.

15. A program storage device readable by a machine tangibly embodying a program of instructions executable by the machine to perform a method for accounting for network usage, said method comprising:

obtaining accounting start-stop event data from two or more accounting servers via an information bus, wherein the information bus contains the accounting start-stop event data published by the two or more accounting servers;

obtaining network flow data independent from said accounting start-stop event data from two or more routers within a network through intermediary netflow collectors, said network flow data including a number and type of packets for a flow, wherein the network flow data also includes a protocol type, a source and destination Internet protocol (IP) address, a next hop address, and a first and last timestamp of packets in the flow;

correlating said accounting start-stop event data and said network flow data into a subscriber specific call detail record unique to said user by matching said accounting start-stop event data associated with said user with said network flow data associated with said user, and wherein the call detail record is reformatted to identify a quality of service for the flow, and a priority designated for the flow.

16. The apparatus of claim 13, wherein said means for obtaining accounting start-stop event data further comprises:

means for parsing said accounting start-stop event data from the two or more accounting servers on a prescribed time interval; and means for publishing said accounting start-stop event data on an information bus.

17. The apparatus of claim 13 wherein said means for obtaining accounting start-stop event data further comprises:

means for collecting said accounting start-stop event data at a target device that subscribes to said accounting start-stop event data.

18. The apparatus of claim 17 wherein said means for obtaining accounting start-stop event data further comprises:

means for collecting said accounting start-stop event data at a target device that subscribes to said accounting start-stop event data.

19. The apparatus of claim 13 wherein said means for obtaining network flow data further comprises:

means for aggregating said network flow data at said intermediary netflow flow collector according to a service provider defined aggregation scheme.

20. The apparatus of claim 19 wherein said means for aggregating said network flow data further comprises:

means for basing aggregation of said network flow data on a specified time period.

21. The apparatus of claim 19 wherein said means for aggregating said network flow data further comprises:

means for basing aggregation of said network flow data on the Internet Protocol Layer 3 source address.

22. The apparatus of claim 19 wherein said means for aggregating said network flow data further comprises:

means for basing aggregation of said network flow data on the Internet Protocol Layer 4 destination address.

23. The apparatus of claim 13, wherein said means for obtaining network flow data further comprises:

means for filtering said network flow data at the intermediary netflow collector according to a service provider defined filtration scheme.

24. The apparatus of claim 13 wherein said means for obtaining network flow data further comprises:

means for collecting said network flow data from the two or more routers and forwarding said network flow data to the intermediary netflow collectors;

means for aggregating said network flow data according to a defined aggregation scheme;

means for parsing said network flow data from said network flow collector;

means for publishing said network flow data on an information bus.

25. The apparatus of claim 13 wherein said means for obtaining network flow data further comprises:

means for filtering said network flow data according to a service provider defined filtration scheme.

26. The apparatus of claim 14, wherein said accounting adapter is configured to obtain accounting start-stop event data from two or more accounting servers via an information bus, wherein the information bus contains the accounting start-stop event data published by the two or more accounting servers.

27. The apparatus of claim 26, wherein said network flow adapter is configured to obtain network flow data independent from the accounting start-stop event data from two or more routers within a network through intermediary netflow collectors, the network flow data including data regarding the number and type of packets utilized by a user.

28. The apparatus of claim 27, wherein said integrating accounting adapter is configured to correlate the accounting start-stop event data and the network flow data into a subscriber specific call detail record unique to the user by matching the accounting start-stop event data associated with the user with the network flow data associated with the user.

* * * * *